United States Patent Office 2,707,903
Patented May 10, 1955

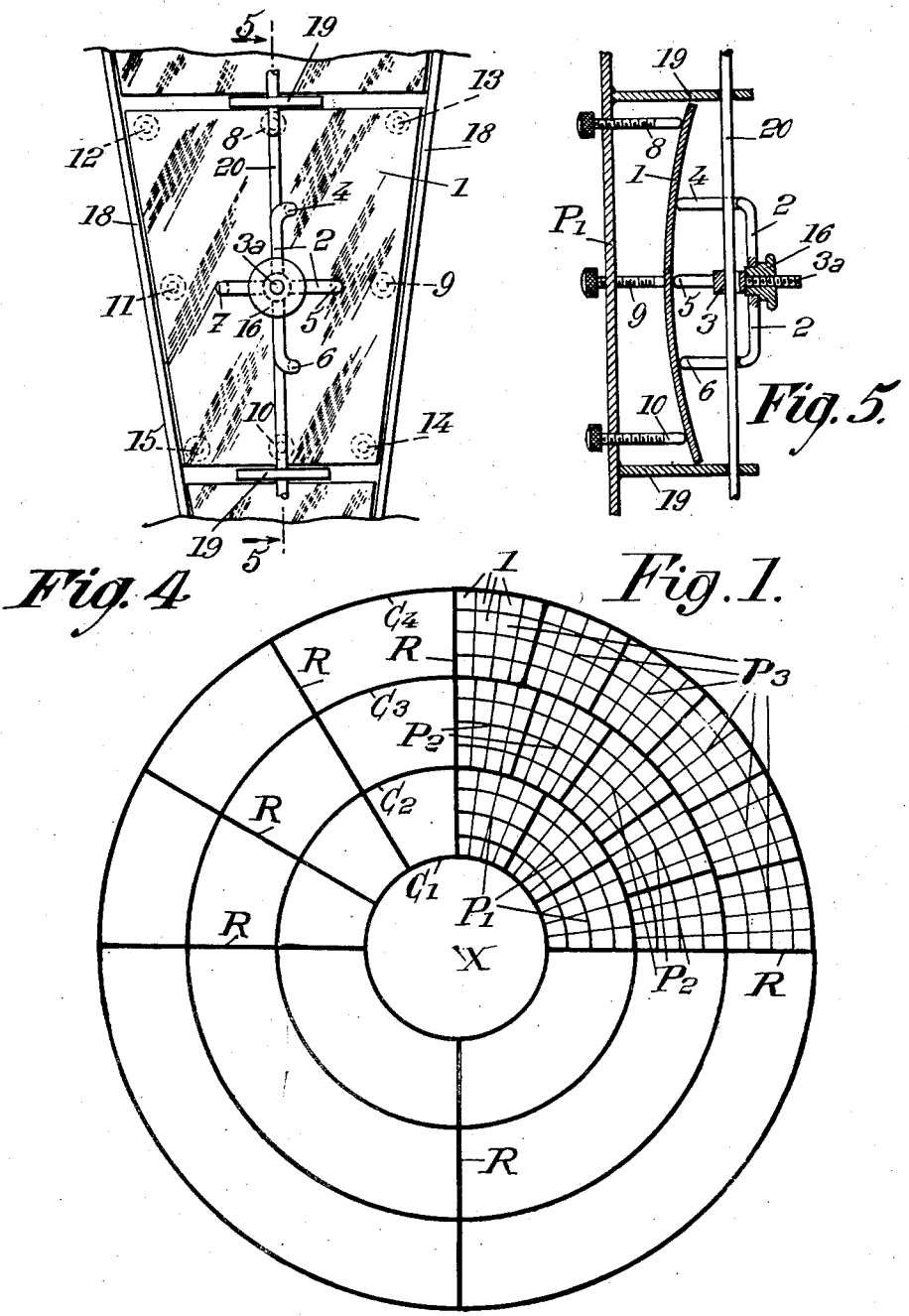

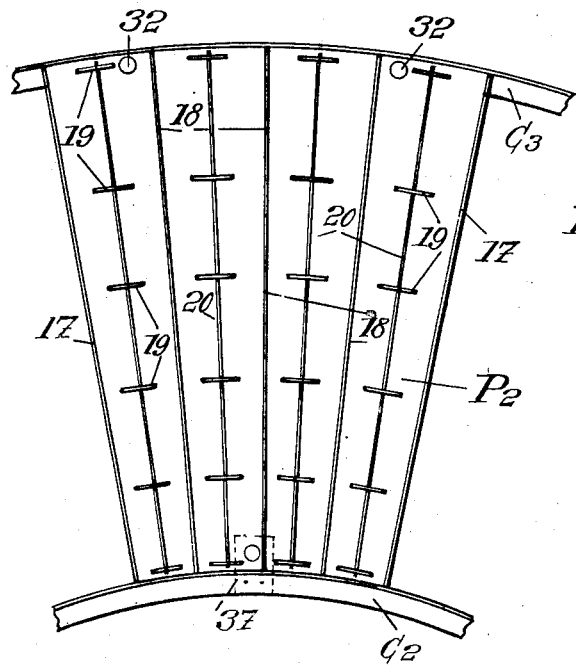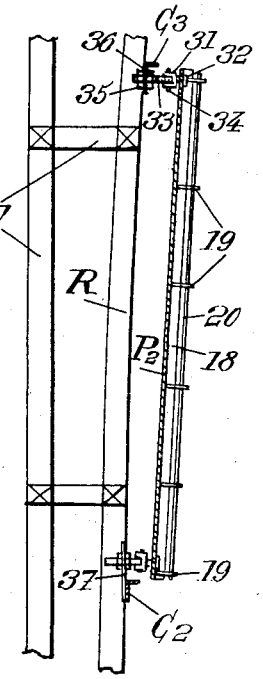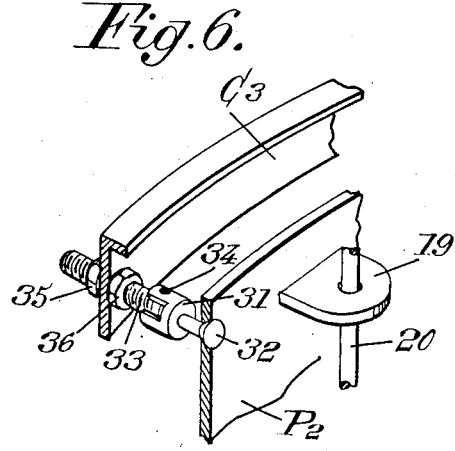

2,707,903

COMPOSITE MIRRORS OF LARGE AREA IN PARTICULAR FOR CONCENTRATING SOLAR ENERGY

Felix Trombe, Paris, France, assignor to Centre National de la Recherche Scientifique (C. N. R. S.), Paris, France, a society of France Application April 10, 1952, Serial No. 281,538

Claims priority, application France April 11, 1951

3 Claims. (Cl. 88—84)

The present invention relates to curved mirrors of large area (several thousand square metres), for instance spherical, parabolic, cylindrical mirrors, in particular for concentrating solar energy.

It is known to constitute such mirrors by the assembly of a multiplicity of plane reflecting elements mounted in suitable positions on respective supports. These elementary mirrors are in fact portions of planes tangent to the theoretical curved surface to be approximately constituted by the composite mirror. In order to obtain a satisfactory concentration of energy by such a mirror, it is necessary to make use of a very high number of plane elements and it is difficult to keep them exactly in their desired positions.

The object of the present invention is to provide a large area composite mirror which avoids these drawbacks.

For this purpose, according to my invention, the elementary mirrors are each constituted by an elastically deformable plate subjected to the action of mechanical deforming means adjusted to give it, at least approximately, the shape of the corresponding portion of the theoretical surface of the mirror, said mechanical deforming means being capable of giving to every elementary mirror the non-symmetrical shape which is that of a small portion of a large mirror, even if this large mirror is itself a body of revolution about an axis, for instance a paraboloid of revolution.

A preferred embodiment of my invention will be hereinafter described, with reference to the accompanying drawings given merely by way of example, and in which:

Fig. 1 is a diagrammatic elevational view of the frame of a mirror according to my invention, some of the elementary mirrors being mounted on this frame;

Fig. 2 is a front elevational view of a mirror supporting plate holding a plurality (twenty) of the elementary mirrors, this plate being mounted on the above mentioned frame;

Fig. 3 is a cross section of the structure of Fig. 2;

Fig. 4 is a front elevational view on an enlarged scale showing the mounting of an elementary mirror on a supporting plate;

Fig. 5 is a cross section on the line 5—5 of Fig. 4;

Fig. 6 is a perspective view showing a detail of Figs. 2 and 3;

Figure 7:
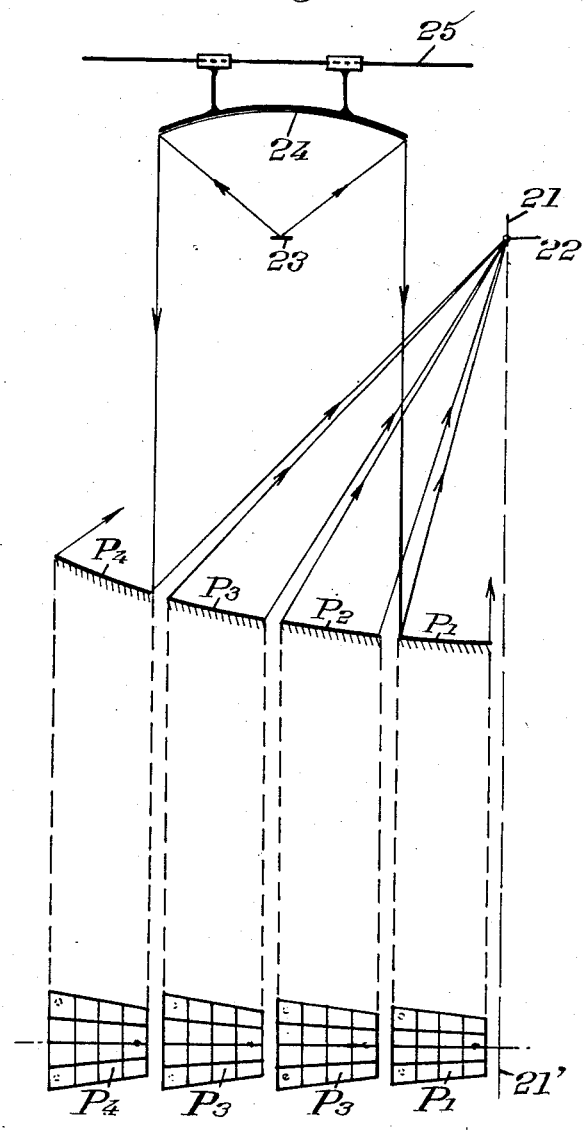
Fig. 7 is a diagrammatical view illustrating a method of adjustment of the elementary mirrors on their supporting plates.

The example shown by the drawing relates to the construction of a parabolic mirror of large area for the concentration of solar energy. The theoretical surface of this mirror is a paraboloid of revolution about an axis X (at right angles to the plane of Fig. 1).

The elementary mirrors 1 are of trapezoidal outline. They are assembled by groups of twenty. Every group of twenty mirrors 1 is carried by a supporting plate or frame plate $P_1$, $P_2$ or $P_3$, itself of trapezoidal outline (with the bases in the form of circular arcs). These frame plates are mounted on a fixed framework so that the composite surface formed by the elementary mirrors is substantially the above mentioned paraboloid.

The fixed framework includes circular members $C_1$, $C_2$, $C_3$, $C_4$ (constituted for instance by L-irons) carried by radial members R (Figs. 1 and 3) so that said circular members coincide more or less with circular sections of the paraboloid by different planes at right angles to axis X. Elements R are themselves supported by an assembly F fixed to the ground.

In the example of my invention shown by the drawing, there are three different shapes of frame plates $P_1$, $P_2$, $P_3$. Plates $P_1$ are of general trapezoidal outline, with the smaller base constituted by a circular arc of a radius equal to that of the circular member $C_1$ of the fixed framework and the larger base constituted by a circular arc of a radius equal to that of the circular member $C_2$ of the frame. Plates $P_2$ are also of general trapezoidal outline, and of about the same width, but the smaller base is constituted by a circular arc of a radius equal to that of the circular member $C_2$ of the framework and the larger base constituted by a circular arc of a radius equal to that of the circular member $C_3$ of the framework. Plates $P_3$ are also of general trapezoidal outline, of about the same width, but the smaller base is constituted by a circular arc of a radius equal to that of the circular member $C_3$ of the framework and the larger base constituted by a circular arc of a radius equal to that of the circular member $C_4$ of the framework.

Thus, plates $P_1$ are juxtaposed to form a circular row between circular members $C_1$ and $C_2$, plates $P_2$ are juxtaposed to form a circular row between circular members $C_2$ and $C_3$ and plates $P_3$ are juxtaposed to form a circular row between circular members $C_3$ and $C_4$.

Every elementary mirror 1 is constituted by a reflecting plate, sufficiently thin to be elastically deformable, held by one of the above mentioned rigid frame plates, for instance plate $P_2$. It will be supposed, by way of example, that mirror 1 is constituted by a thin silver coated glass plate. This mirror plate is caught between fingers bearing thereon on opposite sides thereof, i. e. on its front face and its rear face, the fingers on the front side being not in line with those on the rear side so that mirror plate 1 is curved under the effect of these opposed thrusts.

In the example shown by the drawing, the frame plate $P_2$ carries eight fingers 8, 9, 10, 11, 12, 13, 14, 15 extending at right angles to said plate $P_2$ and screwed thereon so that their respective positions are adjustable. On the other hand, plate $P_2$ is provided with projections or lugs 19 through which extend rods 20, parallel to plate $P_2$ and located on the other side of the reflecting plates 1 from said plate $P_2$. On the portions of every rod 20 located opposite the central regions of mirror plates 1 are mounted cross-shaped members 2, each provided with four fingers 4, 5, 6 and 7 bearing against the front face of the corresponding mirror plate 1. A tubular member 3 mounted on rod 20 with a substantial play (such as shown exaggerated in Fig. 5) includes a threaded rod $3_a$ on which is screwed a nut 16 provided with a shoulder bearing against the corresponding cross-shaped member 2.

Thus, cross-shaped member 2 may be adjusted in position with respect to the corresponding elementary mirror plate 1, first by rotating tubular member 3 slightly about the axis of rod 20 and also, owing to the play above referred to, by rotating said tubular member 3 slightly about an axis at right angles to rod 20 and located in the plane of Fig. 5. The amount of pressure with which the fingers 4, 5, 6, 7 of cross-shaped member 2 are applied against the front face of mirror plate 1 is adjusted at will by screwing or unscrewing nut 16.

It will be readily understood that by suitable adjustment of screws 8, 9, 10, 11, 12, 13, 14, 15 and nut 16 and by initially positioning tubular member 3 and cross-shaped member 2 with respect to rod 20, it is possible to give elementary mirror plate 1 any desired shape within limits imposed by its possibilities of deformation. In particular, it is possible to give it the shape of a non-symmetrical portion of a paraboloid.

In order to prevent any possibility of slipping of elementary mirror plates 1 in directions parallel to the plane of plate $P_2$, this plate carries L-irons 17 extending along its radial edges and T-irons 18 extending along intermediate radial lines. These parts 17 and 18 hold elementary mirror plates 1 against transverse displacement, while lugs 19 hold these mirror plates against radial displacement (see Fig. 4).

Thus, every frame plate $P_1$, $P_2$ or $P_3$ carries a plurality of elementary mirror plates 1 (twenty in the example shown by the drawings) disposed adjacent to one another and each provided with means 4, 5, 6, 7, 8, 9, 10, 11, 12, 13, 14, 15 capable of giving it the desired curvature so that the whole of these elementary mirror plates forms a surface which is a portion of the paraboloid above referred to.

The units formed by these frame plates $P_1$, $P_2$, $P_3$ must now be secured to the framework constituted by elements $C_1$, $C_2$, $C_3$, $C_4$, R and F.

For this purpose, every frame plate, for instance one plate $P_2$ as shown by Figs. 2, 3 and 6, is fixed at three points to said framework, two of these points being located along the circular side of longer radius of said frame plate and the third one on the other circular side thereof.

Figs. 3 and 6 show the detail of the fixation means. A piece 31 is mounted rotatably on a pin 32 riveted in plate $P_2$. This piece 31 forms a kind of fork between the branches of which rod 33 is pivoted about a spindle 34. Rod 33 is screw-threaded and extends through a hole provided in the framework element $C_3$ (or $C_2$) to which it is secured. Two nuts 35 and 36 engaged on said threaded rod 33 make it possible to adjust its position with respect to said framework element.

Owing to this fixation in three points, it is thus possible to secure and adjust frame plates $P_1$, $P_2$, $P_3$ with respect to the framework $C_1$, $C_2$, $C_3$, $C_4$, R, F.

Fig. 7 illustrates a method according to my invention for adjusting the curvature of the elementary mirrors 1. This view corresponds to the case where there are four annular rows of frame plates $P_1$, $P_2$, $P_3$, $P_4$.

In order to perform the desired adjustment, four such plates are mounted, on any suitable support, so as to be located substantially along a parabola having its axis along a line 21, 21' and its focus at 22, this parabola being an axial section of the paraboloid which is to be constituted by the composite mirror.

The elementary mirror plates 1 of the respective plates have already been adjusted approximately to have the desired curvature so that there remains only to finish the adjustment.

A light source 23 mounted at the focus of a parabolic mirror 24 forms a beam of parallel light rays of a direction parallel to axis 21—21', this optical system being arranged to give, at focus 22, an image of an apparent diameter substantially equal to that given by the sun. The optical system 23—24 is slidable along a rod 25 at right angles to axis 21—21'.

Each of the elementary mirror plates 1 is then adjusted separately so that it gives an image located exactly in the plane of focus 22.

Owing to the construction according to my invention, it is possible to constitute a composite mirror including a number of elementary mirror plates equal to only 1/12 or 1/15 of the number of mirrors which would be necessary if the elements were constituted by plane mirrors. For a plant giving 80 kws., one hundred and fifty elementary mirrors each of an area of 0.7 sq. metre is sufficient.

Thus the operation of individually adjusting each of these elementary mirrors is not too long.

It is further pointed out that the use of plane elementary mirrors necessitates the use of rather thick plates in order to be able to give them the desired plane shape. Such mirrors are heavy and costly. Furthermore, as their reflecting silver coating is located on their rear face, the light rays have to travel along a relatively long path through their thickness and a substantial amount of solar energy is thus lost.

With the construction according to the present invention, it is possible to make use of much thinner glass plates and, owing to the effect of the mechanical stresses applied to these mirror plates, they keep their shape much more easily than flat elements, despite the action of wind, vibrations, thermal expansion and so on.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A composite mirror of large area which comprises, in combination, a multiplicity of elementary mirrors in the form of elastically deformable mirror plates, frame means for supporting said mirror plates in juxtaposed relation to one another, a plurality of fingers carried by said frame means arranged to bear at different points respectively on the rear face of each of said mirror plates, a plurality of fingers carried by said frame means arranged to bear at different points respectively on the front face of each of said mirror plates, the first mentioned fingers being located on points of the mirror plate different from those on which are located the second mentioned fingers, and independent means for adjusting the position of each of said fingers transversely to said mirror plates, whereby each of said mirror plates can be given, by adjustment of said fingers, substantially the shape of the corresponding portion of the theoretical surface of the mirror to be constituted by the assembly of said elementary mirror plates, said first mentioned fingers being distributed in the peripheral region of the mirror plate area and, said second mentioned fingers in the central region thereof, the number of said second mentioned fingers being four, said composite mirror including, opposite every elementary mirror plate a cross-shaped member supported by said frame means so as to be rotatable with respect thereto about two axes at right angles to each other, said cross-shaped member supporting said four second mentioned fingers.

2. A composite mirror of large area which comprises, in combination, a multiplicity of elementary mirrors of trapezoidal outline constituted each by an elastically deformable mirror plate, a plurality of frame plates each carrying a group of said elementary mirror plates, said frame plates being of substantially trapezoidal outline with their bases in the form of concentric circular arcs so as to form sectors of several annular rows, a plurality of fingers carried by each of said frame plates arranged to bear at different points respectively on the rear face of each of the mirror plates of the group carried by said frame plate, a plurality of fingers carried by each of said frame plates arranged to bear at different points respectively on the front face of each of the mirror plates of the group carried by said frame plate, the first mentioned fingers being located on points of the mirror plates different from those on which are located the second mentioned fingers, means for independently adjusting the position of each of said fingers transversely to said frame plates, whereby each of the mirror plates of one group can be given, by adjustment of said fingers, substantially the shape of the corresponding portion of the theoretical surface of the mirror to be constituted by the assembly of said groups, a framework for carrying all of said frame plates, and means for adjustably securing said frame plates to said framework so that the reflecting surfaces of all the elementary mirror plates form substantially said theoretical surface.

3. A composite mirror according to claim 2 in which the mirror plates are mounted to form, on the corresponding frame plates, several rows concentric with the curved sides of said plates and several radial lines, the first mentioned fingers being threaded and adjustably screwed in said frame plates, at right angles thereto, a plurality of rods carried by each frame plate on the other side of the elementary mirror plates from said frame plate, each of said rods extending along the middle line of every radial line of elementary mirror plates, the second mentioned fingers being adjustably carried by said rods.

References Cited in the file of this patent

UNITED STATES PATENTS

| | | |
|---|---|---|
| 1,794,103 | Cubitt | Feb. 24, 1931 |
| 1,951,404 | Goddard | Mar. 20, 1934 |
| 2,081,299 | Hill | May 25, 1937 |

FOREIGN PATENTS

| | | |
|---|---|---|
| 19,732 | Great Britain | of 1908 |
| 405,507 | Italy | Aug. 17, 1943 |